United States Patent
Kalliokulju

(10) Patent No.: US 6,178,326 B1
(45) Date of Patent: Jan. 23, 2001

(54) CELL SELECTION INFLUENCED BY STORED DATA AND MOBILE STATION USING SAME

(75) Inventor: Juha Kalliokulju, Vesilahti (FI)

(73) Assignee: Nokia Mobile Phones Ltd., Espoo (FI)

(*) Notice: Under 35 U.S.C. 154(b), the term of this patent shall be extended for 0 days.

(21) Appl. No.: 09/161,859

(22) Filed: Sep. 28, 1998

(30) Foreign Application Priority Data

Sep. 30, 1997 (FI) ........................................... 973838

(51) Int. Cl.⁷ ...................................................... H04Q 7/20
(52) U.S. Cl. ........................ 455/437; 455/436; 455/453
(58) Field of Search ............................... 455/438, 425, 455/558, 437, 436, 453

(56) References Cited

U.S. PATENT DOCUMENTS

| | | | |
|---|---|---|---|
| 5,175,867 | 12/1992 | Wejke et al. | 455/33.1 |
| 5,293,641 * | 3/1994 | Kallin et al. | 455/33.1 |
| 5,345,448 | 9/1994 | Keskitalo | 370/95.3 |
| 5,396,653 | 3/1995 | Kivari et al. | 455/88 |
| 5,410,733 | 4/1995 | Niva et al. | 455/33.2 |
| 5,430,740 | 7/1995 | Kivari et al. | 371/37.1 |
| 5,483,668 | 1/1996 | Malkamaki et al. | 455/33.2 |
| 5,524,009 | 6/1996 | Tuutijarvi et al. | 370/95.3 |
| 5,561,845 | 10/1996 | Bendixen et al. | 455/33.4 |
| 5,568,153 | 10/1996 | Beliveau | 342/357 |
| 5,570,353 | 10/1996 | Keskitalo et al. | 370/18 |
| 5,577,024 | 11/1996 | Malkamaki et al. | 370/18 |
| 5,606,548 | 2/1997 | Vayrynen et al. | 370/252 |
| 5,659,598 | 8/1997 | Byrne et al. | 455/436 |
| 5,708,656 | 1/1998 | Noneman et al. | 370/320 |
| 5,710,974 | 1/1998 | Granlund et al. | 455/33.2 |
| 5,726,981 | 3/1998 | Ylitervo et al. | 370/332 |
| 5,745,503 | 4/1998 | Kuusinen | 371/37.1 |
| 5,764,632 | 6/1998 | Ylitervo | 370/337 |
| 5,765,103 | 6/1998 | Chang et al. | 455/434 |
| 5,774,809 | 6/1998 | Tuutijarvi et al. | 455/437 |
| 5,790,534 | 8/1998 | Kokko et al. | 370/335 |
| 5,794,149 * | 8/1998 | Hoo | 455/438 |
| 5,794,156 | 8/1998 | Alanara | 455/517 |
| 5,884,147 * | 3/1999 | Reudink et al. | 455/67.1 |
| 5,966,657 * | 10/1999 | Sporre | 455/425 |
| 5,999,811 * | 12/1999 | Molne | 455/432 |
| 6,011,976 * | 1/2000 | Michaels et al. | 455/466 |
| 6,018,654 * | 1/2000 | Valentine et al. | 455/414 |

FOREIGN PATENT DOCUMENTS

WO 94/06220    3/1994    (WO) .

* cited by examiner

Primary Examiner—Edward F. Urban
Assistant Examiner—Blane J. Jackson
(74) Attorney, Agent, or Firm—Perman & Green, LLP

(57) ABSTRACT

A method for selecting a cell in a mobile communication system based on a cellular network and a mobile station arranged to operate in the cellular network. The mobile station is used for storing information on at least one subscriber-specific base station, the cell served by the base station being the mobile subscriber's home cell, office cell or the like. The mobile station is used for changing the determined level of the signal of at least one selected radio channel on the basis of information on the subscriber-specific base station. The mobile station has memory for storing information on at least one subscriber-specific base station serving the cell which is the mobile subscribers home cell, office cell, or the like. The mobile station is configured to change the level of the signal determined for at least one selected radio channel on the basis of information on the subscriber-specific base station.

12 Claims, 3 Drawing Sheets

CELL SELECTION INFLUENCED BY STORED DATA AND MOBILE STATION USING SAME

FIELD OF THE INVENTION

The present invention relates to a method for selecting a cell in a mobile communication system based on a cellular network and comprising: at least one mobile station, at least one base station and at least one radio channel for data transmission between the mobile station and the base station serving the same, wherein the mobile station comprises at least one subscriber identity module (SIM), in which method the mobile station receives information, such as the base station identification code and signal frequency, on at least one selected radio channel, the mobile station measures the strength of the signal of at least one selected radio channel, the mobile station defines the level of the signal of at least one selected radio channel on the basis of the information received from the measurement, the mobile station transmits a measurement report containing information on the level of the signal of at least one selected radio channel, and, if necessary, the mobile station receives, a command to change the radio channel. The invention relates further to a mobile station arranged to operate in a cellular system, the mobile station comprising: at least one subscriber identity module (SIM), means for receiving information, such as the base station identification code and signal frequency, on at least one selected radio channel, means for measuring the signal strength of at least one selected radio channel, means for determining the level of the signal of at least one selected radio channel on the basis of the information received, means for transmitting a measurement report containing information on the level of the signal of at least one selected radio channel, and means for receiving, if necessary, a command to change the radio channel.

BACKGROUND OF THE INVENTION

In modern public land mobile networks (PLMN) based on a cellular network, the system consists in a known way of several mobile stations (MS) using the system, such as mobile telephones, and a fixed base station subsystem (BSS). This base station subsystem comprises usually several base transceiver stations (BTS) distributed in a geographical area, and each base transceiver station serves a cell comprising at least part of this geographical area. Data transmission, e.g. transmission and reception of speech or data, between a mobile station located in the area of the cell and the base transceiver station, takes place by means of radio communication by using radio channels reserved for the cell. The operation of one or several base stations is controlled by a base station controller (BSC) belonging to the base station subsystem and having the function of e.g. controlling the use of radio channels. The area of the cell served by the base station depends inter alia on the strength of the transmitter of the base station, wherein the sufficient strength for the signal of the radio channel received by the mobile station depends e.g. on the distance from the mobile station to the base station. The strength of the signal received by the mobile station is influenced for example by the topography of the geographical area of the cell and the directivity of the antenna of the base station, even though the distance from the mobile station to the base station remains the same. Consequently, the shape of the coverage area of the cell varies to a great extent. However, when illustrating the operating principle of a cellular network, usually either circular or hexagonal areas are used to illustrate a cell. One or several base station controllers communicate with a mobile services switching centre (MSC) which transmits the communications between base stations belonging to the mobile services switching centre within the mobile communication network, to other mobile services switching centres, or to a public switched telephone network (PSTN).

When a mobile station, such as a mobile phone or a mobile terminal placed in a vehicle, moves from one cell to another, there is an arrangement in public mobile communication networks for preventing disconnection of ongoing data transmission e.g. between a first base station and the mobile station during this move. The data transmission in question can be for example a telephone conversation between two users of mobile phones or a data transmission between a mobile terminal and a computer coupled with a public switched telephone network. Disconnection of a radio connection used for data transmission can result from e.g. the fact that the signal of the radio channel of the base station serving the first cell is weak and/or is lower than the level below which reliable and error-free data transmission is not possible. Thus the data transmission must be transferred to the radio channel used by the base station serving another cell. This transfer can be implemented by these two base stations and a base station controller, if they are coupled to the same base station controller, or further one or several mobile services switching centres if the base stations are coupled to different base station controllers. For implementing the transfer, the base station transmits inter alia a command to the mobile station to carry out a change of the radio channel used for the data transmission.

Because of the popularity of use of mobile stations, such as mobile terminals and particularly personal portable mobile phones, their number has continuously increased, and as a result, the charges paid by a mobile subscriber for data transmission services have come down because of the competition between different network operators. Furthermore, network operators endeavour to develop and increase the services offered by them to the users of mobile stations. These services include providing data transmission connections to a packet data network (PDN) and to an integrated services digital network (ISDN) in addition to a public switched telephone network. By means of these data transmission connections, it is also possible e.g. for different service providers of the INTERNET network to develop their services for the users of mobile stations, such as mobile phones and portable computers connected with them e.g. by means of PCMCIA cards. Further, the network operators endeavour to offer mobile subscribers individual services, such as data transmission connections at a lower charge than the normal charge. Less expensive services can be offered e.g. in the area of the geographical location of the place of employment of the mobile subscriber, when the subscriber's mobile station communicates with the base station of this geographical area, i.e. the so-called office cell. Thus the charges debited for data transmission connections can be e.g. less expensive within the area of this office cell and normal in the area of other cells. It is also possible to offer less expensive services in the area of the cell with the geographical location of the mobile subscriber's home, i.e. the so-called home cell.

U.S. Pat. No. 5,568,153 discloses a system and method for maintaining data of mobile subscriber information based on defining the so-called home area and work area by means of the geographical location and a radius selected for the area. These data are entered in the home location register (HLR) of the mobile communication network, and on the basis of these information, the mobile services switching centre determines whether the mobile station is in the area of a cell served by a base station which is located in the geographically defined home area or work area. On the basis of this information, it is possible to change the charge to be debited for the data transmission connection when the mobile station moves to the service area of said base station. However, a considerable disadvantage of this system is the increased need of the mobile services switching centre to handle mobile subscriber registration data. Further, when there are several home and work areas and an increased number of service providers and services, there is also an increased number of registration data stored in the databases of the mobile communication network, such as the home location register and thus also the visitor location register (VLR). Furthermore, a reduction in cell areas cause an increased need for data transmission between registers e.g. in order to conduct channel changes particularly in densely populated urban areas. The shrinking of cells will result in an increase in registration data, which will also cause a need to raise the storage capacity of base stations and, further, the implementation will cause extensive changes e.g. in the controller software of the base station system. Moreover, the geographical location of the mobile station must be determined on the basis of the signal transmitted from the mobile station and received by e.g. by different base stations, which will further greatly increase the need for data transmission and cause delays in the mobile communication network. Further, U.S. Pat. No. 5,568,153 presented above does not disclose how to take into account with which serving base station the mobile station is in radio communication when located within the home area, but the charge is based solely in the geographical location of the mobile station.

In public mobile communication networks in practice, such as the Global System for Mobile Communication (GSM) standardised by the European Telecommunications Standards Institute (ETSI), the cells can be geographically at least partly overlapping. Further, it is possible that within the coverage area of the cell there is another, smaller cell served by a base station offering the client e.g. less expensive subscriber-specific services. Also thus in situations where the signal of the radio channel of the base station received by the mobile station particularly in the edge zones of the smaller cell has low strength, according to the prior art the data transmission must be transferred to be conducted between the mobile station and that base station where the signal of the radio channel has preferably the highest strength as measured by the mobile station.

According to prior art, when the mobile station moves to the coverage area of the smaller cell, it is also possible that the communication between the mobile station and the high-strength base station will not be transferred at all to the radio channel used by the base station of the smaller cell, because priority in cell selection is given advantageously to the radio channel used by the base station with the highest strength. The above-presented patent U.S. Pat. No. 5,568, 153 does not disclose any alternatives for solving this problem. Thus in the placement of base stations, upon the stage of constructing a mobile communication network and upon reduction of the coverage areas of cells, one must increasingly take into account also the strength of signals of radio channels of base stations serving adjacent cells and cells operating in the same area in a single cell. This will raise the costs of planning and limit the placement of base stations as well as the options for selecting output power of base stations serving new cells.

SUMMARY OF THE INVENTION

The purpose of the present invention is to eliminate disadvantages in the prior art and to present a very simple and totally novel method for selecting a cell in a mobile communication system based on a cellular network. Another purpose is to present a mobile station according to the invention. More precisely, the method of the invention is characterized in that the mobile station is used for storing information on at least one subscriber-specific base station, the cell served by the base station being the mobile subscriber's home cell, office cell or the like, and the mobile station is used for changing the defined level of the signal of at least one selected radio channel on the basis of information on the subscriber-specific base station. The mobile station according to the invention is characterized in that the mobile station comprises means for storing information on at least one subscriber-specific base station, the cell served by the base station being the mobile subscribers home cell, office cell or the like, and that the mobile station comprises means for changing the defined level of the signal of at least one selected radio channel on the basis of information on the subscriber-specific base station.

The invention gives several remarkable advantages related e.g. to the operation of the mobile communication system as well as advantages for the mobile subscriber. Using the method of the invention, the transfer of communication between the mobile station and the base station to another radio channel can be controlled in a subscriber-specific way so that the chances of mobile network operators to offer services for example in the form of less expensive data transmission connections are improved in relation to prior art. Further, the method has the remarkable advantage that the chances of a single mobile subscriber to transfer as soon as possible to the radio channel of a base station serving the home cell or office cell offering e.g. less expensive services, even a single base station, in connection with a channel change, are improved in relation to prior art. These chances are improved also under the circumstances where the signals of radio channels of the base stations adjacent to this home cell or office cell are strong. This is useful particularly when a new base station is placed in the area of cells of a mobile communication network already constructed, to serve mobile subscribers located in the area of a geographically small cell, e.g. in a building or buildings.

A significant advantage of an advantageous embodiment of the method according to the invention is that the changes required in the mobile communication system for applying the method can be made preferably only in the mobile station. These changes can be easily taken into account in the planning and manufacture of new product versions of mobile stations, for example portable mobile phones. Further, a particular significant advantage of an advantageous embodiment of the method according to the invention is that it is possible to avoid preferably totally the storage of subscriber-specific registration data related to the home cells, office cells or the like of the mobile subscriber in the home location register and the visitor location register of the mobile services switching centre. As a result, there is a considerably reduced need for internal data transmission in the mobile communication network for the maintenance of these registration data and a faster operation of the mobile communication system in comparison with the prior art.

A further particular advantage obtained with the method of the invention is that the mobile stations can be transferred even in a subscriber-specific way in connection with a channel change to be served by the base stations of such cells that have e.g. sufficient capacity for the data transmission. Thus for example data communication of mobile subscribers can be easily transferred from congested base stations.

The focal principle in the method of the invention is that the measurement report transmitted by the mobile station to the serving base station, containing information e.g. on the level of strength of signals of the radio channels used by the base stations of the adjacent cells, are changed in the mobile station in a subscriber-specific way on the basis of identification data of the base station stored in the mobile station and on the basis of cell-specific parameter information. Thus, this subscriber-specific information relates e.g. particularly to the cells defined as the mobile subscriber's home cells, office cells or the like. Thus, upon selection of a new base station and cell conducted on the basis of the measurement report, e.g. in connection with the channel change of the mobile station, these above-mentioned cells can be preferred as a result of the changes. In prior art, selection of a new base station and simultaneously of a new cell in a subscriber-specific way has not been possible.

BRIEF DESCRIPTION OF THE DRAWINGS

In the following, the invention will be described in more detail with reference to the appended figures, in which.

DETAILED DESCRIPTION OF THE PREFERRED EMBODIMENT

Figure 1:
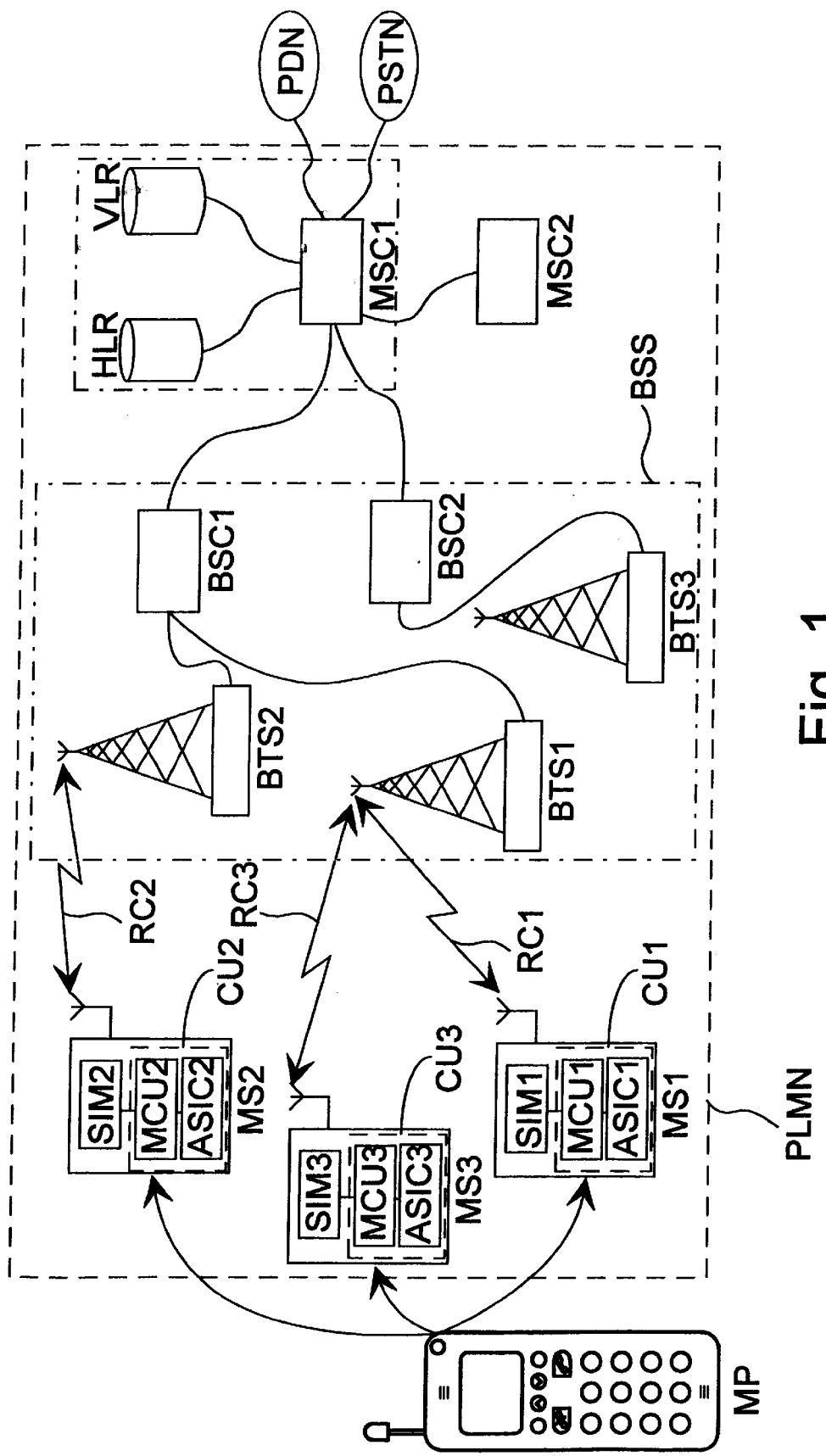
FIG. 1 shows a mobile communication system in a schematic view.
Figure 2:
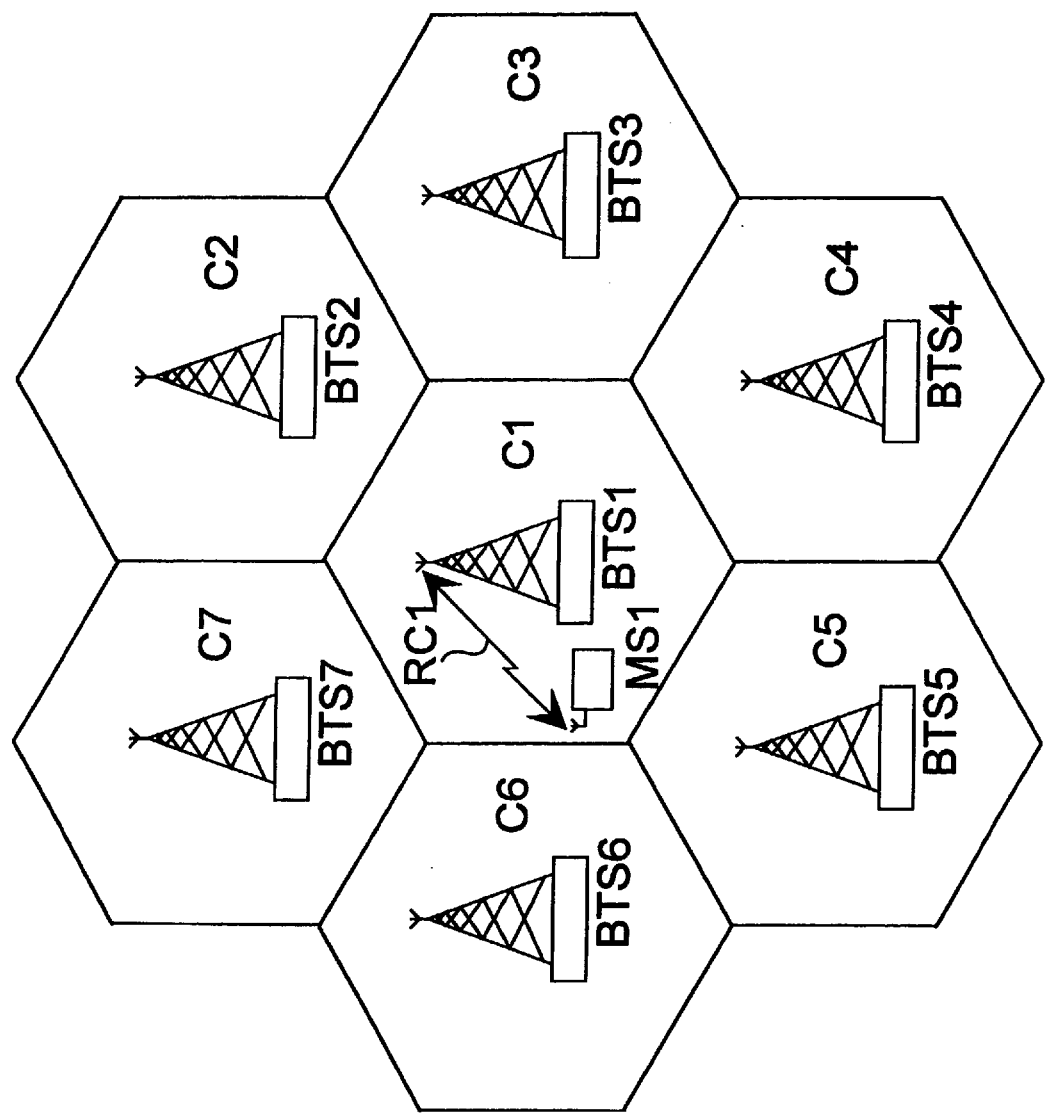
FIG. 2 shows a cellular network of a mobile communication system.

As shown in FIG. 1, a public land mobile network PLMN based on a cellular network, such as the GSM system, comprises in a known manner several mobile stations MS1, MS2 and MS3, such as mobile phones MP as shown in FIG. 1, and a fixed base station subsystem BSS. This base station subsystem comprises usually several base transceiver stations BTS1, BTS2 and BTS3 distributed in a geographical area, each base transceiver station BTS1 to BTS7 serving a cell C1 to C7 which comprises at least part of this geographical area, as shown in FIG. 2. Further with reference to FIGS. 1 and 2, communication, such as transmission and reception of speech or data, between the mobile station MS1 and the base transceiver station BTS1 in the area of cell C1 takes place via a radio connection RC1 by using radio channels allocated to the cell C1. The operation between the base transceiver stations BTS1 and BTS2 is controlled by means of a base station controller BSC1 belonging to the base station subsystem BSS and having the function of e.g. controlling the use of radio channels and controlling channel changes. The base station controller BSC1 communicates with a mobile services switching centre MSC1, which has the function of exchanging the connections between the base transceiver stations BTS1 to BTS7 connected with it, to other mobile services switching centres, such as MSC2, to a public switched telephone network PSTN, or to a packet data network PDN. To illustrate the invention, FIGS. 1 and 2 show only three mobile stations MS1, MS2, MS3 and the base transceiver stations BTS1 to BTS7, but in a known way the system comprises usually a large number of mobile stations as well as base transceiver stations serving them. Further, FIG. 2 shows the cells C1 to C7, but in a known way the system comprises usually a large number of cells having a varying coverage area and even distributed unevenly over a geographical area. Also, the system comprises usually more than two mobile services switching centres MSC1 and MSC2.

Of the existing frequency range intended for radio communications, only the frequency band allocated to the public land mobile network PLMN is available for it, and further, part of this frequency band is used by the radio channel intended for communication between e.g. the base transceiver station BTS1 and the mobile station MS1 by means of the radio connection RC1. Usually, there are several radio channels available for the base transceiver station BTS1 for communication between several mobile stations MS1 and MS3 and the base transceiver station BTS1. For example in the digital GSM system, there are the frequency bands 890 to 915 MHz (uplink, i.e. data transmission from the mobile station to the base station) and 935 to 960 MHz (downlink, i.e. data transmission from the base station to the mobile station) available, each band further comprising 124 radio channels at a difference of 200 kHz. When one or several same radio channels are used for communication by two different base transceiver stations, the geographical distance between these base stations and simultaneously the cells must be sufficient so that they would not disturb each other. However, the strength of the signal of the base station far from the base station is usually so weak that communication is no longer possible. However, for the mobile communication network to serve the mobile subscribers in an efficient way, it is possible to place one or several base transceiver stations serving a new cell between the above-mentioned base stations using the same radio channels, e.g. BTS2 and BTS5 in FIG. 2, this new base station, such as the base station BTS1 in FIG. 2, using different radio channels than the above-mentioned base stations. Analog frequency division multiple access (FDMA) systems of prior art, such as Advanced Mobile Phone Service (AMPS) and Nordic Mobile Telephone (NMT), apply the principle presented above, wherein each radio channel is allocated its own frequency band, i.e. a so-called physical radio channel is formed.

Nevertheless, with an increase in the number of users of mobile stations in a mobile communication network, it has been necessary to increase the communication capacity of base stations, wherein the physical radio channel is further divided into logical radio channels in the time level. Each logical radio channel is allocated a time slot in the time level, wherein data transmission takes place e.g. between the mobile station MS1 and the base station BTS1 in FIG. 1 by using the physical radio channel. Thanks to this arrangement, the same physical radio channel can be used for communication between several mobile stations, such as the mobile stations MS1 and MS3 and the base station BTS1 in FIG. 1. Digital time division multiple access (TDMA) systems of prior art, such as D-AMPS, GSM and JDC/PDC, apply the principle presented above for dividing the physical radio channel into logical radio channels in the time level. For example in the digital GSM system, the physical radio channel is divided into eight logical radio channels. In this text, a radio channel indicates always the physical radio channel, unless mentioned otherwise.

According to FIG. 1, the user of the mobile station MS1, such as a mobile phone MP, can communicate with subscribers of the public switched telephone network PSTN via the public land mobile network PLMN according to prior art. Two different mobile stations MS1 and MS2 located in different cells can be in speech communication with each other via the base station controller BSC1, if necessary, and also via at least one mobile services switching centre MSC1, if necessary, in case the base stations BTS1 and BTS2 are controlled by different base station controllers. Further, with reference to FIGS. 1 and 2, the mobile services switching centre MSC1 maintains e.g. information on the locations of the mobile stations MS1, MS2 in the area of the cells C1 to C7 of the base stations BTS1 to BTS7 by means of a home location register HLR and a visitor location register VLR. These registers HLR and VLR contain e.g. the telephone number and the international mobile subscriber number (IMSI) of the mobile station MS1. The home location register HLR comprises information on mobile stations registered in the mobile services switching centre MSC1 and their locations. The visitor location register VLR contains information on those mobile stations which are temporarily registered in the mobile services switching centre MSC1. Different mobile services switching centres exchange this information for maintenance of communication in the mobile communication network.

With reference to FIG. 1, e.g. mobile stations MS1 operating in the GSM system must have at least one subscriber identity module (SIM) comprising also a memory for storing the subscriber-specific identification data of the mobile subscriber of the mobile station MS1. These identification data include the IMSI code and telephone number of the mobile subscriber. Further, messages transmitted by the short message service (SMS) of the mobile communication network can be stored in the memory of the SIM module. Also the address of the visitor location register in which the data of the mobile station are maintained can be stored temporarily in the SIM module. By means of subscriber-specific identification data, it is possible to direct incoming messages and calls from other mobile stations or from a fixed telephone network to the correct mobile station. If necessary, the SIM module can also be transferred to another mobile station, wherein also incoming calls are directed to this second mobile station. Further, with reference to FIG. 1, the mobile station MS1 comprises also a control unit CU1 for controlling the functions of the mobile station, such as receiving and transmitting communication, measuring the radio signal, as well as reading information from and storing information on the SIM card. The control unit CU1 comprises advantageously a micro controller unit MCU1 and a control logic circuit ASIC1, such as an application specific integrated circuit. Further, the control unit CU1 is advantageously provided with a memory, such as a read-only memory (ROM) and a read/write memory (RAM). The operation of the mobile station is prior art known as such to a man skilled in the art, wherein a more detailed description will be rendered unnecessary in this context.

In analog FDMA systems, the decision on selecting the radio channel and thus simultaneously on selecting the cell is made solely by the base station serving the mobile station. The base station monitors continuously e.g. the strength of the signal transmitted by the mobile station to the base station, and if the strength of the signal is below a set threshold level, the base station requests also the base stations of the adjacent cells to measure the signal of the mobile station and to report it to the base station. Thus the serving base station can make the decision on selecting a new cell. In this way the mobile communication system can select a new base station to serve the mobile station and the radio channel to be used.

In digital TDMA systems, such as the GSM system, the mobile station measures continuously the strength of the signals of the radio channels of the serving base station and the adjacent base stations. With reference to FIG. 2, the serving base station BTS1 transmits to the mobile station MS1 a list of these adjacent base stations, e.g. BTS2 to BTS7, having the radio channels whose signal strength is to be monitored. According to the GSM standard, this list contains e.g. the base station identity code (BSIC) of the base station, and the list is transmitted on the logical broadcast control channel (BCCH) used by the serving base station. The mobile station measures the signal strength advantageously continually and transmits to the serving base station a measurement report on the strength level of the signals of the radio channels. This measurement report is transmitted by the mobile station on a logical slow associated control channel (SACCH). According to the GSM standard, the measurement report contains e.g. information on the strength level of the signal of the serving base station and even six adjacent base stations. If a channel change is to be made on the basis of these measurements, it can be made quickly, because the new serving base station is already known. The transmission of speech and data can thus be continued on the logical traffic channel (TCH) of the new physical radio channel. The network operator makes the decision on the channel change and cell selection e.g. on the basis of the measurement report, but measurements on the strength of the signal of the mobile station are carried out also in the base station. Also when the serving base station finds that the strength of the signal of the radio channel used for communication is below a set threshold value, the channel change and cell selection can be made, utilizing the measurement report transmitted by the mobile station. One known means is to arrange the cells in an order according to the levels of the signals of the base stations, wherein the base station with the highest strength comes first. The new cell is selected on the basis of this order, and traffic is moved to the radio channel of the base station of the new cell which has the radio channel with the highest signal strength level. Thus in connection with the channel change, communication is moved to take place between the mobile station and this new base station. By means of the measurement report transmitted by the mobile station, also the serving base station can notice if the level of the signal of an adjacent base station is higher than the level of the signal of the serving base station, wherein the decision on selecting a new cell can be made also solely on the basis of this information. Decisions on the selection of a new cell are required also for directing the load caused by data transmission to another base station. Decisions relating to the selection of a new cell are known as such to a man skilled in the art, wherein an extensive description will be rendered unnecessary in this context.

Figure 3:
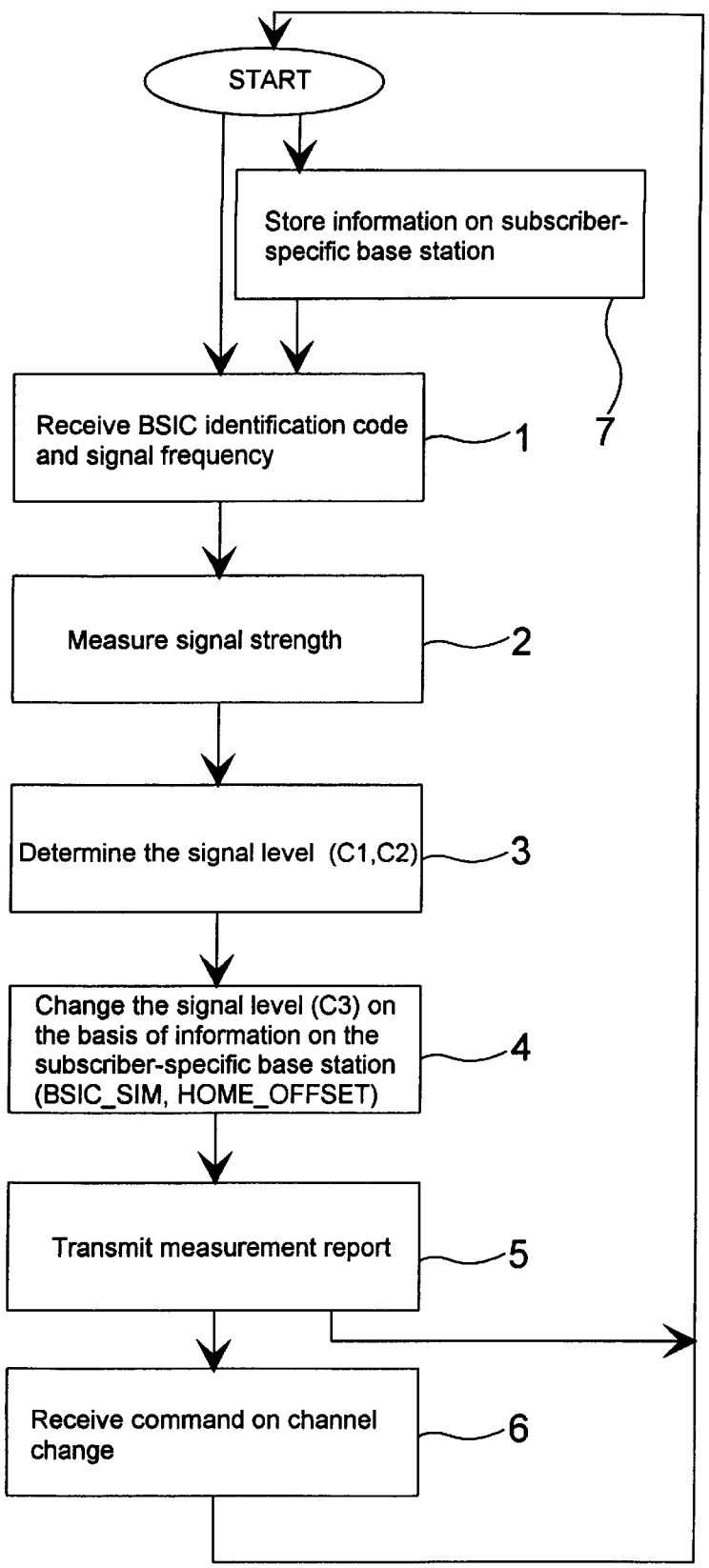
FIG. 3 is a flow chart on the method according to the invention.

In the following, with reference to e.g. FIG. 3, the method of the invention will be presented in detail in a mobile communication system according to the GSM standard, but it will be obvious for a man skilled in the art that the method can be applied also in other mobile communication systems based on a cellular network, within the scope of the claims. With reference to FIG. 1, the method for selecting a cell in a mobile communication network based on a cellular network, the system comprises at least one mobile station MS1, at least one base station BTS1 and at least one radio channel for communication between the mobile station MS1 and the base station BTS1 serving it, wherein the mobile station MS1 comprises at least one subscriber-specific SIM module SIM1. As shown in the flow chart in FIG. 3, the method of the invention comprises receiving (block 1) by the mobile station MS1 of information of at least one selected radio channel, such as the BSIC identification code of the base station BTS2 and the frequency of the signal of the radio channel, and measuring (block 2) by the mobile station MS1 of the strength of the signal of at least one selected radio channel. In the next step, the mobile station MS1 determines (block 3) the strength level of the signal of at least one selected radio channel (parameters C1 and C2)

on the basis of information from the measurement, and according to the method of the invention, the mobile station MS1 changes (block 4) the determined strength level of the signal of at least one selected radio channel (parameter C3) on the basis of information on the subscriber-specific base station, in this case the base station BTS2 (parameters BSIC_SIM and HOME_OFFSET). These changes can thus involve the measurement information on all the base stations, and the purpose is to prefer the selection of the subscriber-specific base station and cell e.g. in connection with a channel change. In the next step, the mobile station MS1 transmits (block 5) in ways known as such a measurement report containing information on the level of the signal of at least one selected radio channel, and, if necessary, the mobile station MS1 receives (block 6) a command to carry out a radio channel change. In the method of the invention, the mobile station stores (block 7), if necessary, information on at least one subscriber-specific base station BTS2 serving at least one cell which is thus this subscriber's home cell, office cell or the like.

In a mobile station according to the GSM standard, the levels of the signals of the radio channels contained in the measurement report are determined by using in a known manner the method to be presented in the following, wherein for calculating the parameter C2 describing the signal level for each signal of the radio channel of the selected base station, the following formula can be used:

$$C2=C1+CELL\_RESELECT\_OFFSET-TEMPORARY\_OFFSET* H(PENALTY\_TIME-T),$$

in which formula the values of all parameters are given in the dBm unit. The parameter CELL_RESELECT_OFFSET is a cell-specific negative or positive value which is determined by the network operator and can be used to effect the strength of the measured signal. It should be noted that this parameter is cell-specific and its value is transmitted to all the mobile stations served by the base station of the cell. In the calculation, the parameter TEMPORARY_OFFSET receives a negative value, whose effective time is determined by the parameter H(PENALTY_TIME-T). The parameter H is a function whose value is determined by the value of the formula PENALTY_TIME-T, wherein when the result of PENALTY_TIME-T is negative, the value of the parameter H is zero, and when the result of PENALTY_TIME-T is zero or positive, the value of the parameter H is one. For calculating the parameter H, T is a stepping counter whose value is set to zero when the signal is included according to the standard in the measurement list of the six signals with the highest strength. The purpose of the parameter H is to prevent the mobile station from moving into the base station of this signal during the time given by the parameter PENALTY_TIME. An exception to the setting of the counter T is the case where the previous base station that has served the mobile station is entered again in the measurement list, wherein the parameter T is set to the value PENALTY_TIME, and wherein the parameter C2 for the signal for the radio channel in question is now calculated from the formula:

$$C2=C1+CELL\_RESELECT\_OFFSET,$$

wherein the parameters are as above. During calculation of the parameter C2 for the signal of the radio channel of the base station serving the cell, H is set to zero, wherein C2 is calculated from the formula $$C2=C1+CELL\_RESELECT\_OFFSET.$$

In connection with channel change, the preferred base station is the one which has the highest value of the parameter C2 for the signal of the radio channel in the measurement report transmitted by the mobile station. Before this, the value of the parameter C2 can still be influenced by means of the parameter PENALTY_TIME, wherein this parameter PENALTY_TIME set in its maximum value, having a bit sequence corresponding to the value "11111", is changed to the form of a calculation formula for the parameter C2:

$$C2=C1-CELL\_RESELECT\_OFFSET.$$

The values used in the calculation for the parameters CELL_RE-SELECT_OFFSET, PENALTY_TIME and TEMPORARY-OFFSET can be transmitted by the serving base station to the mobile station. It should be noticed that the network operator can select the values for these parameters in a cell-specific way, but the values of these parameters are thus the same for all mobile stations which are served by this base station and to which it transmits information on the radio channels to be measured.

For calculating the value of the parameter C1, the following formula is used:

$$C1=(A-Max(B,0)),$$

in which the parameter A is calculated from the formula:

$$A=RLA-PXLEV\_ACCESS\_MIN, \text{ in which}$$

the parameter RLA (received level average) is the average strength of the signal of the base station measured by the mobile station for a certain radio channel. This average can be determined e.g. from several measurements at selected intervals. The parameter PXLEV_ACCESS_MIN indicates the minimum signal level of the radio channel of the base station, at which the mobile station can still reliably receive data transmission. The parameter B is calculated form the formula:

$$B=MS\_TXPWR\_MAX\_CCH-P,$$

in which
the parameter MS_TXPWR_MAX_CCH describes the highest transmission output power of the mobile station when it sets up a radio connection with a base station, and the parameter P is the maximum transmission output power of the mobile station. The values of the parameters are given in dBm units. In the calculation of the parameter C1 according to the formula given above, the value of the parameter B is taken into account if it is greater than zero. The parameter C1 is used for the determination of whether the signal of the base station serving the cell, received by the mobile station, has weakened to give rise e.g. to a channel change. Thus the value of the parameter C1 is negative. In an advantageous embodiment of the method according to the invention, the mobile station changes the level of the signal strength determined for the selected radio channel used by the base station corresponding to the subscriber-specific base station, and the change is made on the basis of information on this subscriber-specific base station. According to an advantageous embodiment of the invention, the level of the signal determined for the selected radio channel is changed by adding a selected threshold value. The following is a description of a method, wherein, in addition to determining the parameters C1 and C2 presented above, also a parameter C3 is determined by calculation from the formula:

$$C3=C2+K(BSIC\_SIM-BSIC)*HOME\_OFFSET,$$

in which the parameter C2 is calculated as presented above, the parameter HOME_OFFSET is a positive or negative value selected according to the subscriber and the cell for changing the value of the parameter C2 if the value of the parameter K is different from zero. The parameter K is a function, whose value is determined according to the value of the formula BSIC_SIM–BSIC, wherein when the result of BSIC_SIM–BSIC is different from zero, the value of the parameter K is zero. In the calculation, BSIC is the index for the base station whose parameters C1, C2 and C3 are being evaluated. The parameter BSIC_SIM is an identification of the base station and simultaneously also the cell, determined in a subscriber-specific way to describe the home cell, office cell or the like. According to the formula, for calculating the parameter C3, the HOME_OFFSET value, selected in a both cell-specific and subscriber-specific way, is added to the value of the parameter C2, if the mobile subscriber's home cell, office cell or the like is involved. When the mobile station transmits the measurement report to the serving base station, the value of the parameter C3 is used as the value for the parameter C2:

$$C2=C3.$$

It should be noted that the value for the parameter HOME_OFFSET can be set to zero, wherein no subscriber-specific determinations will be taken into account in the calculation of the parameters C1 and C2. In the calculation, the values for the parameters BSIC_SIM and HOME_OFFSET stored in the mobile station are utilized. There can be several of these values determined for the subscriber. According to an advantageous embodiment of the invention, information is stored on the SIM module of the mobile station.

It is obvious for a man skilled in the art that the method presented above for changing the signal level can be implemented in several ways within the scope of the claims. In one alternative, the subscriber-specific determinations are taken into account by supplementing the formula used for calculating the parameter C2 with the formula used for calculating the parameter C3, for example:

$$C2=C1+CELL\_RESELECT\_OFFSET+K(BSIC-SIM-BSIC)*\\HOME-OFFSET,$$

wherein the operation of the parameters is as above. It is obvious for a man skilled in the art that the same result is obtained by deducting the parameter HOME_OFFSET from the signal level of all other base stations than the base station of the home cell, office cell or the like, but the method presented above is simpler. According to an advantageous embodiment of the invention, the changes presented above can be applied in the control unit CU1 controlling the operation of the mobile station, for example by modifications made in the control program of the mobile station.

The method according to the invention works in the following way. Let the BSIC identification codes of the base stations of the available cells be for example 2, 5, 32, 67, 4, 21, 64, 7, 1, 45, 63, and 80. The mobile station receives information transmitted by the network operator on selected base stations, e.g. the BSIC identification codes 7, 4, 21, 32, 64, and 67, which are the identification codes of the base stations for the cells adjacent to the serving base station. The base station with the BSIC identification code 80 is the mobile subscribers home cell, office cell or the like. This home cell identification code BSIC_SIM and the value of the parameter HOME_OFFSET to be used for this home cell, for example 20 dB, are stored in the mobile station. The mobile station measures the strength of signals from selected base stations and calculates the strength level in the above-presented way. The home cell is not included in the selected base stations, so that HOME_OFFSET will not influence the calculation of the value for the parameter C2, the value of K being zero for all selected base stations. Thus, on the basis of the signal level of the radio channels, the base stations can be arranged e.g. in the order 32, 67, 4, 21, 64, and 7. Upon moving of the mobile station, and for example after selection of a new base station 32 serving the cell and after a channel change, new information is received on selected base stations, e.g. the BSIC identification codes 2, 4, 21, 64, and 80, wherein upon calculation of the parameter C2 they can be arranged e.g. in the order 67, 4, 21, 64, 80, and 2. This calculation, however, takes into account the value of the parameter HOME_OFFSET, wherein the value of the parameter HOME_OFFSET is added by calculation to the value of the calculated signal level of the base station 80. Now, when the mobile station moves further in the area of the cell, wherein when the strengths of the signals of the radio channels for the base stations are measured continuously, their defined strength level C2 is changed and sets the base stations in the order 80, 67, 2, 4, 64, 21, wherein the parameter HOME_OFFSET is again taken into account in the determination of the signal level of the base station 80. In the measurement report transmitted by the mobile station, this base station of the selected ones has the highest strength level, wherein this cell can be selected for example in connection with a channel change. This cell is simultaneously the mobile subscriber's home cell, office cell or the like. Thus, this cell can be selected as early as possible for example in connection with a channel change. It should be noticed that for other mobile stations, the value of the parameter BSIC_SIM can be different, as well as the value of the parameter HOME_OFFSET, wherein the signal levels are now determined in a subscriber-specific way and they now vary among those located in the same cell.

According to an advantageous embodiment of the invention, information on at least one subscriber-specific base station is stored on the subscriber-specific SIM module of the mobile station, in which the data is stored e.g. in a memory area for which the user has no right to read or write. The structure and operation of the SIM module are known as such for a man skilled in the art, wherein an extensive explanation will not be necessary in this context.

One system for transmitting messages containing text is the short message service of the GSM system. Thus the message to be transmitted can be formed by using e.g. a mobile station or a data processor communicating with a public telephone network, as a short message which is supplemented with identification data, such as the telephone number, of the mobile station of the recipient. On the basis of the identification, the short message is transmitted to the mobile station of the recipient. A short message service centre SM-SC controls the transmission of short messages in the GSM system. The mobile station of the recipient receives the short message and informs the recipient about the receipt of the message. Thus, the recipient can read the received short message e.g. by means of the menu functions of the mobile station. Further, the transmitting and receiving mobile station can belong to the mobile communication networks of different network operators, and they can also be mobile stations of different mobile communication systems, if the capacity for transmitting short messages is provided between these mobile communication systems. Another known way for transmitting varying information from the base station to the mobile station is the unstructured supplementary services data (USSD) service of the GSM system.

According to an advantageous embodiment of the invention, information on at least one subscriber-specific base station is transmitted to the mobile station by using the short message service SMS. Thus, the network operator transmits the above-described value of the parameter BSIC_SIM or the like, corresponding to the mobile subscriber's home cell, office cell or the like. Simultaneously, the operator transmits also the value for the parameter HOME_OFFSET, or the like, to be used in the cell in question. This information is stored e.g. in the memory of the SIM module of the mobile station, from which the data can be read in connection with determining the signal levels of the radio channels. It is obvious for a man skilled in the art that the invention is not limited solely to the example presented above, but the embodiments of the invention can vary within the scope of the claims to be presented below.

What is claimed is:

1. A method for selecting a cell in a mobile communication system based on a cellular network and comprising at least one mobile station, at least one base station, and at least one radio channel for data transmission between the mobile station and the base station serving the same, wherein the mobile station comprises at least one subscriber identity module, in which method the mobile station receives information including the base station identification code and signal frequency, on at least one selected radio channel, the mobile station measures the strength of the signal of at least one selected radio channel, the mobile station defines the level of the signal of at least one selected radio channel on the basis of the information received from the measurement, the mobile station transmits a measurement report containing information on the level of the signal of at least one selected radio channel, and, the mobile station receives, if necessary, a command to change the radio channel, wherein:

the mobile station is used for storing information on at least one subscriber-specific base station, the cell served by the base station including the mobile subscriber's home cell or office cell, and the mobile station is used for changing the defined level of the signal of at least one selected radio channel on the basis of information on the subscriber-specific base station.

2. The method according to claim 1, wherein the mobile station is used for changing the signal level determined for the selected radio channel used by the subscriber-specific base station on the basis of the information on this subscriber-specific base station.

3. The method according to claim 1, wherein the mobile station is used for changing the signal level determined for the selected radio channel used by the subscriber-specific base station by summing to it a selected change value.

4. The method according to claim 1, wherein the change is implemented at least partly in the control unit of the mobile station.

5. The method according to claim 4, wherein the mobile station receives information on at least one subscriber-specific base station by using a short message service SMS.

6. The method according to claim 1, wherein information on at least one subscriber-specific base station is stored on the subscriber-specific SIM module of the mobile station.

7. The method according to claim 1, wherein the information on the subscriber-specific base station comprise at least:

the identification code of the selected subscriber-specific base station or the selected change value, or a combination of these.

8. A mobile station arranged to operate in a cellular system, the mobile station comprising:

at least one subscriber-specific SIM module, means for receiving information on at least one selected radio channel, such as the base station identification code and the signal frequency of the radio channel, means for measuring continuously the strength of the signal of at least one selected radio channel, means for determining the strength level of the signal of the selected radio channel by means of data obtained from the measurement, means for transmitting a measurement report containing information on the signal level of at least one selected radio channel, and means for receiving a command to change the radio channel, if necessary, wherein:

the mobile station comprises means for storing information on at least one subscriber-specific base station serving the cell including mobile subscribers home cell or office cell and wherein the mobile station comprises means for changing the level of the signal determined for at least one selected radio channel on the basis of information on the subscriber-specific base station.

9. The mobile station according to claim 8, wherein the means for changing the level of the signal determined for at least one selected radio channel on the basis of information on the subscriber-specific base station comprise the control unit of the mobile station.

10. The mobile station according to claim 8, wherein the mobile station comprises means for receiving information on at least one subscriber-specific base station by means of a short message service SMS.

11. The mobile station according to claim 8, wherein the means for storing information on at least one subscriber-specific base station serving the cell which includes the mobile subscribers home cell or office cell comprise the subscriber-specific SIM module of the mobile station.

12. The mobile station according to claim 8, wherein the information on the subscriber-specific base station comprise at least:

the identification code of the selected subscriber-specific base station, or the selected change value, or a combination of these.

* * * * *